US012305675B2

(12) United States Patent
Carlson

(10) Patent No.: US 12,305,675 B2
(45) Date of Patent: May 20, 2025

(54) HYDRAULIC POWER AMPLIFICATION

(71) Applicant: Great Plains Manufacturing, Inc., Salina, KS (US)

(72) Inventor: Jason Carlson, Lindsborg, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 0 days.

(21) Appl. No.: 18/332,911

(22) Filed: Jun. 12, 2023

(65) Prior Publication Data

US 2024/0410399 A1 Dec. 12, 2024

(51) Int. Cl.
*F15B 3/00* (2006.01)
*E02F 3/43* (2006.01)
*E02F 9/22* (2006.01)
*E02F 3/34* (2006.01)

(52) U.S. Cl.
CPC ................ *F15B 3/00* (2013.01); *E02F 3/431* (2013.01); *E02F 9/2267* (2013.01); *E02F 9/2271* (2013.01); *E02F 3/3414* (2013.01); *E02F 9/2203* (2013.01)

(58) Field of Classification Search
CPC .................................. F15B 3/00; E02F 3/431
See application file for complete search history.

(56) References Cited

U.S. PATENT DOCUMENTS

| | | | |
|---|---|---|---|
| 3,875,365 | A | 4/1975 | Beneteau |
| 5,542,180 | A | 8/1996 | Karani |
| 2012/0055149 | A1 | 3/2012 | Vonderwell |

FOREIGN PATENT DOCUMENTS

| | | | | |
|---|---|---|---|---|
| EP | 2327884 A1 | | 6/2011 | |
| JP | H04157206 A | | 5/1992 | |
| JP | 2001-342648 | * | 12/2001 | .............. E02F 9/226 |
| WO | WO2010005896 A1 | * | 1/2014 | ................ F15B 3/00 |

OTHER PUBLICATIONS

Machine Translation of WO2010005896 and JP2001-342648 are merged with the document itself (2024).*

Fuqiang Chen et al., Research on Velocity Fluctuation of High Pressure and High Flow Double Booster Cylinder Hydraulic System, Department of Mechanical Engineering, Tsinghua University, Beijing, China, May 2, 3020, 12 pages.

Fluid Power Intensifiers, Series PC, PD and PS, for Cylinder Division Plant Locations, Parker Cylinder, Parker Fluidpower Intensifiers, 8 pages.

* cited by examiner

*Primary Examiner* — Kenneth Bomberg
*Assistant Examiner* — Daniel S Collins
(74) *Attorney, Agent, or Firm* — Hovey Williams LLP; Kameron D. Kelly

(57) ABSTRACT

Hydraulic power amplification systems and methods configured to selectively supply an interval of increased force to a working hydraulic cylinder. The systems generally comprise a working cylinder and a pressure amplification cylinder. The rod side chamber of the working cylinder is in fluid communication with the rod side chamber of the working cylinder, such that shifting of the pressure amplification cylinder piston increases the power applied to the rod side of the working cylinder piston. The hydraulic power amplification systems and methods are particularly useful for providing supplemental breakout force to working cylinders on loader equipment, such as bucket loaders.

15 Claims, 5 Drawing Sheets

HYDRAULIC POWER AMPLIFICATION

FIELD OF THE INVENTION

Embodiments of the present invention are directed generally to systems and methods for selectively amplifying power to a hydraulic working cylinder. Embodiments of the present invention are particularly useful for providing supplemental breakout force to working cylinders on loader equipment, such as bucket loaders.

BACKGROUND OF THE INVENTION

Hydraulic cylinders are commonly used on many types of heavy-equipment machines and/or agricultural equipment. For example, a hydraulic assembly comprising one or more hydraulic cylinders may be used on loader so as to raise and lower arms and/or rotate or otherwise move a loader attachment, such as a bucket attachment. Loaders on construction equipment have limitations on the force available for use to curl-back (pry) with a bucket attachment. The reason for these limitations is based on the geometry of the loader dictating that the rod end of the working (bucket) cylinder is used to curl the bucket back. Linkages like the Z-bar linkages have been used to address this problem. However, for some machines, these linkages hinder cab accessibility, reduce visibility, and add more maintenance points with greasing pins. Alternatively, system pressure could be raised through the main valve to generate more force, but this would require more expensive valving and plumbing. Thus, there is a need for simplified hydraulic assemblies capable of selectively supplying power amplification to working cylinders.

SUMMARY OF THE INVENTION

Embodiments of the present invention are directed to a hydraulic circuit, which can be used to amplify the hydraulic power available to a hydraulic cylinder. The hydraulic circuit generally comprises a primary working cylinder, which can be selectively fed by a secondary power amplification cylinder. The circuit can include valves used to selectively apply power from the power amplification cylinder to the working cylinder. In certain embodiments, the power amplification can be used to provide an enhanced breakout force for a bucket cylinder, such as may be necessary for breaking out concrete, removing stumps, and/or high-force digging. Importantly, the power amplification operations according to embodiments of the present invention provide for an increase of force applied to the rode side of the working cylinder piston.

In one embodiment of the present invention, there is provided a hydraulic power amplification system comprising: a working cylinder comprising a first barrel, a first piston base slidably disposed within the first barrel and defining a first bore side chamber and a first rod side chamber, and a first piston rod extending from the first piston base through the first rod side chamber; and a pressure amplification cylinder comprising a second barrel, a second piston base slidably disposed within the second barrel and defining a second bore side chamber and a second rod side chamber, and a second piston rod extending from the second piston base through the second rod side chamber. The pressure amplification cylinder is configured to selectively provide hydraulic fluid to the working cylinder to amplify an operating pressure of the working cylinder. When the pressure amplification cylinder is providing the hydraulic fluid to the working cylinder, the second rod side chamber of the pressure amplification cylinder provides the hydraulic fluid to the first rod side chamber of the working cylinder.

In another embodiment of the present invention, there is provided a method for providing power amplification to a hydraulic cylinder assembly comprising a working cylinder having a working piston disposed therein and a pressure amplification cylinder having an amplification piston disposed therein. The method comprises: (a) introducing hydraulic fluid to a first rod side chamber of the working cylinder, the first rod side chamber being in fluid communication with a second rod side chamber of the pressure amplification cylinder; and (b) activating a power amplification operation by introducing a power amplification fluid to a bore side chamber of the pressure amplification cylinder so as to shift the amplification piston within the pressure amplification cylinder, thereby increasing the pressure of the hydraulic fluid within both the second rod side chamber of the pressure amplification cylinder and the first rod side chamber of the working cylinder.

In yet another embodiment of the present invention, there is provided a method for providing power amplification to a hydraulic cylinder assembly installed on a loader. The hydraulic cylinder assembly comprises a working cylinder and a pressure amplification cylinder. The method comprises: (a) introducing a hydraulic fluid to the working cylinder, thereby shifting a working piston disposed within the working cylinder and moving a loader attachment mechanically coupled to the working piston; and (b) activating a power amplification operation by shifting an amplification piston within the pressure amplification cylinder, the pressure amplification cylinder being in fluid communication with the working cylinder such that shifting the amplification piston increases the pressure of the hydraulic fluid within the working cylinder.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Embodiments of the present invention are described herein with reference to the following drawing figures, wherein.

Figure 1:
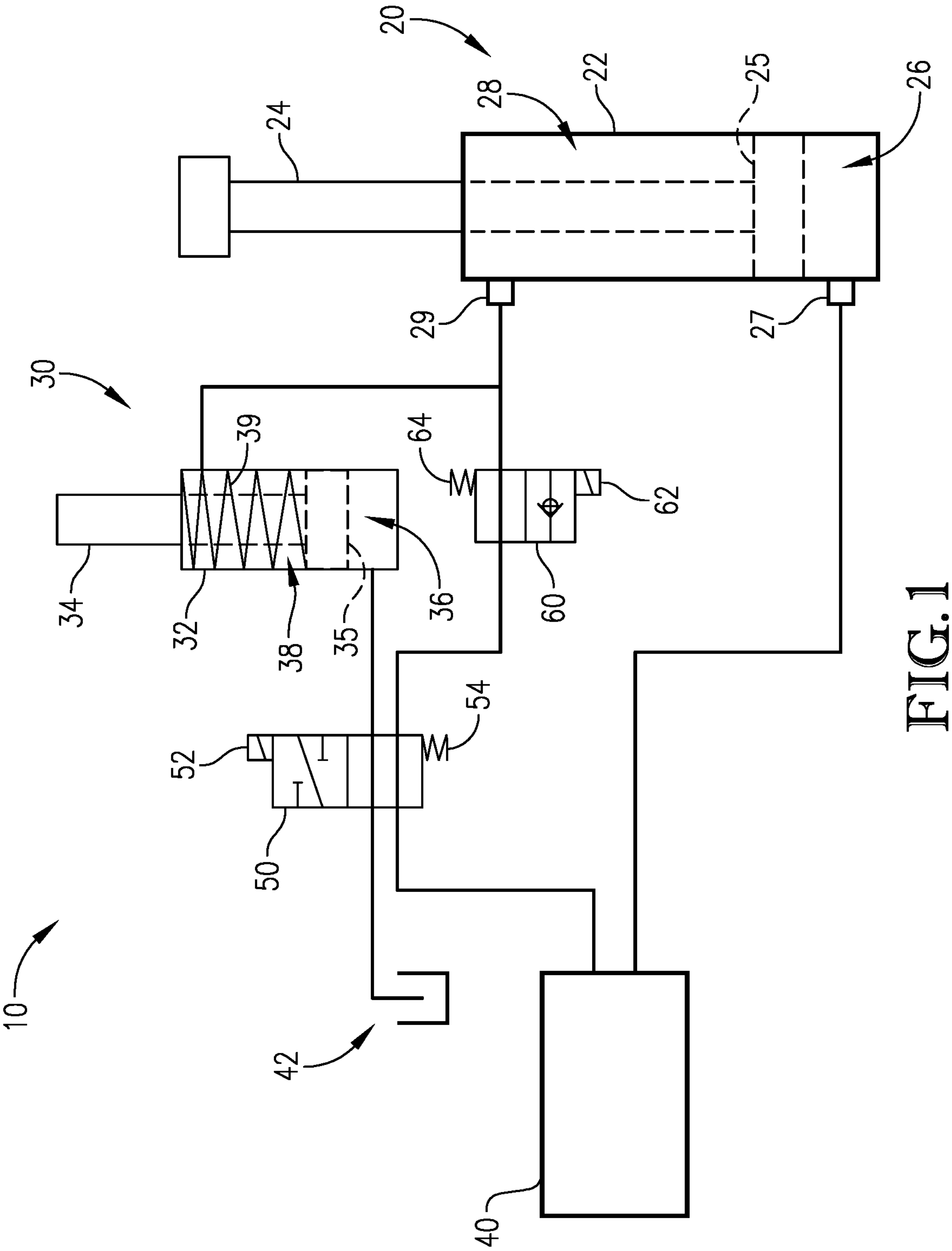
FIG. 1 is a schematic diagram depicting a hydraulic circuit, according to one embodiment of the present invention.

The drawing figures do not limit the present invention to the specific embodiments disclosed and described herein.

The drawings are not necessarily to scale, emphasis instead being placed upon clearly illustrating the principles of the invention.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

An exemplary hydraulic circuit for a power amplification system 10 is schematically illustrated in FIG. 1 and generally comprises a working hydraulic cylinder 20, a pressure amplification hydraulic cylinder 30, and a main valve 40 configured to selectively introduce and remove a working hydraulic fluid into and from the system 10.

Hydraulic working cylinder 20 generally comprises a barrel 22, a piston base 25 slidably disposed within the barrel 22, and a piston rod 24 extending from the piston base 25. The piston base 25 defines a bore side chamber 26 and a rod side chamber 28 within the barrel 22. The piston rod 24 extends through the rod side chamber 28 and is configured to extend from and retract within the barrel 22. The barrel 22 may include a barrel attachment bracket or other securement mechanism that is configured to facilitate securement of the working hydraulic cylinder 20 to a heavy-equipment machine (e.g., a loader), agricultural equipment, or the like. In addition, the piston rod 24 may include a rod attachment bracket or other securement mechanism secured to the distal end of the rod 24 (i.e., the end opposite the base 25) that is configured to be secured to a component or mechanism that is to be actuated via the extension and/or retraction of the piston rod 24.

The barrel 22 includes a first port 27 located adjacent a first end of the barrel 20 and a second port 29 located adjacent an opposed second end of the barrel 22. The first port 27 is configured to allow hydraulic to flow into and out of the bore side chamber 26, and the second port 29 is configured to allow hydraulic to flow into and out of the rod side chamber 28. In operation, pressurizing the hydraulic working cylinder 20 by supplying hydraulic fluid to the bore side chamber 26 (via first port 27) will cause the piston rod 24 to extend outward from bore side chamber 26 of the barrel 22. In contrast, pressurizing the hydraulic cylinder 20 by supplying hydraulic fluid to the rod side chamber 28 (via the second port 29), while releasing pressure from the bore side chamber 26, will cause the piston rod 24 to retract within the barrel 22.

Pressure amplification cylinder 30 generally comprises a barrel 32, a piston base 35 slidably disposed within the barrel 32, and a piston rod 34 extending from the piston base 35. The piston base 35 defines a bore side chamber 36 and a rod side chamber 38 within the barrel 32. The piston rod 34 extends through the rod side chamber 38 and may be configured to extend from and retract within the barrel 32, although in some embodiments, piston rod 34 does not need to extend out of barrel 32. Pressure amplification cylinder 30 is configured to selectively provide hydraulic fluid to the working cylinder 20 to amplify an operating pressure of the working cylinder 20. In particular, the rod side chamber 38 of the pressure amplification cylinder 30 is in fluid communication with the rod side chamber 28 of the working cylinder 20. Thus, when power amplification of the working cylinder 20 is desired, the piston base 35 of the pressure amplification cylinder 30 is shifted in the direction of the rod side chamber 38 and provides hydraulic fluid to the rod side chamber 28 of the working cylinder 20, thereby increasing the operating pressure therein. In certain embodiments, pressure amplification cylinder 30 may comprise a spring 39 disposed within the rod side chamber 38 configured to bias the piston base 35 and to resiliently shift the piston base 35 toward the bore side chamber 36 after completion of an activation operation (or event).

Power amplification system 10 may further comprise one or more (or two or more) valves configured to control the flow of hydraulic fluids through the system 10. As noted above, main valve 40 is configured to selectively introduce and remove a working hydraulic fluid into and from the system 10. In particular, main valve 40 is configured to selectively introduce and/or remove hydraulic fluid to/from the bore side chamber 26 and the first rod side chamber 28 of the working cylinder 20. Main valve 40 may be a variety of valve types, but may generally comprise any of a variety of direction control valves. Although depicted as a single valve component, main valve 40 may comprise two or more separate valves.

In certain embodiments, system 10 may comprise a power amplification valve 50 configured to divert hydraulic fluid introduced by the main valve 40 from the working cylinder 20 to the pressure amplification cylinder 30. During a power amplification operation (or event), the power amplification valve 50 may be activated to introduce at least a portion of the hydraulic fluid introduced by the main valve 40 into the bore side chamber 36 of the pressure amplification cylinder 30. As shown, in certain embodiments, power amplification valve 50 may be in the form of a two-position valve, with the flow therethrough being controlled by a solenoid 52 and/or spring 54.

In certain embodiments, system 10 may comprise a check valve 60 positioned between the main valve 40 and the rod side chamber 28 of the working cylinder 20. The check valve 60 is configured to selectively inhibit hydraulic fluid within the rod side chamber 28 of the working cylinder 20 and/or within the rod side chamber 38 of pressure amplification cylinder 30 from flowing back toward the main valve 40. Thus, during a power amplification operation (or event), the check valve 60 can be utilized to maintain the increased pressure in the rod side chamber 28 of the working cylinder. As shown, in certain embodiments, check valve 60 may be in the form of a two-position valve, with the activation and deactivation of the check valve function being controlled by a solenoid 62 and/or spring 64.

Figure 2:
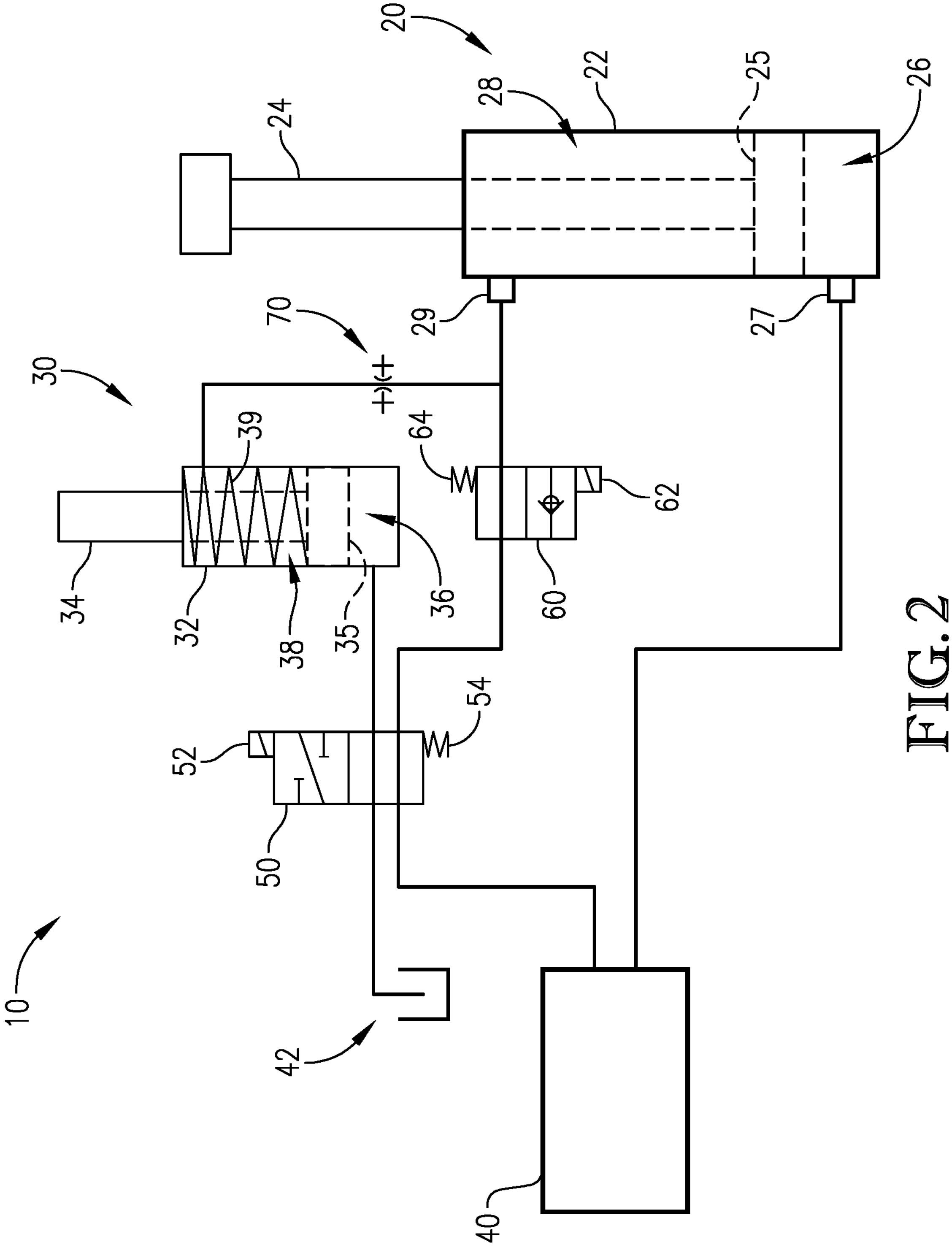
FIG. 2 is a schematic diagram depicting a hydraulic circuit, according to one embodiment of the present invention.

As shown in FIG. 2, in certain embodiments, system 10 may comprise a restriction element 70 (e.g., fixed flow restrictor, a variable flow restrictor, or a one-way restrictor) positioned between the rod side chamber 28 of the working cylinder 20 and the rod side chamber 38 of the pressure amplification cylinder. As described below, upon completion of a power amplification operation, hydraulic power amplification fluid is released from the bore side chamber 36 of the pressure amplification cylinder 30, thereby shifting the piston base 35 in barrel 32 toward the bore side chamber 36. This shifting, combined with the release of hydraulic fluid from the rod side chamber 28 of the working cylinder 20, can cause a rapid drop in pressure of the hydraulic fluid within the rod side chamber 28 of the working cylinder 20, thereby causing a delay in the working cylinder 20 operation. Thus, the restriction element 70 may be configured to at least partly inhibit the flow of the hydraulic fluid from the rod side chamber 28 of the working cylinder 20 to the rod side chamber 38 of the pressure amplification cylinder 30 when the hydraulic fluid is being released from the rod side chamber 28, thereby reducing or eliminating the delay in operation of the working cylinder 20. The restriction element 70 may be in the form of a flow control valve, a narrowing of the fluid line, and/or other flow restriction mechanism.

Figure 3:
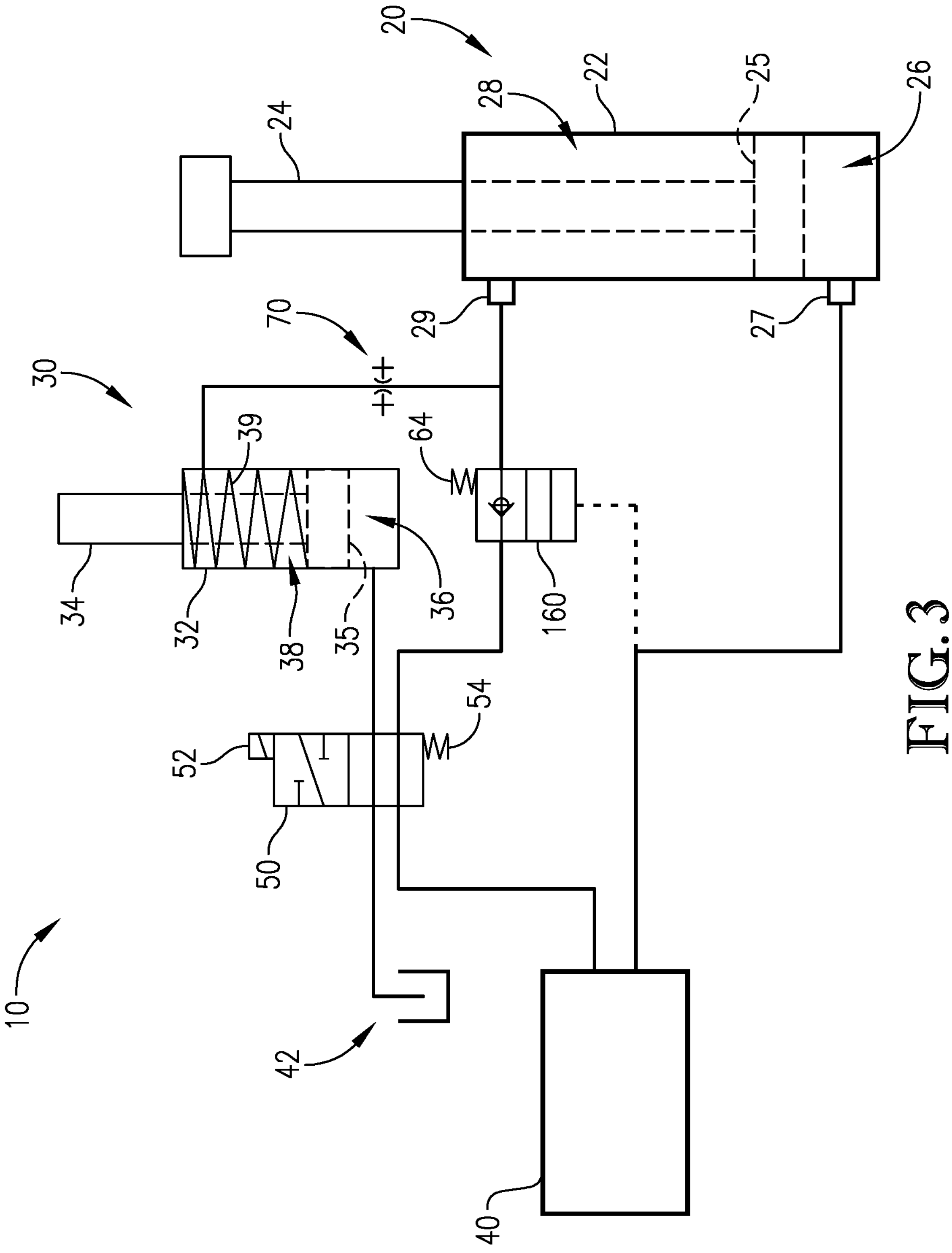
FIG. 3 is a schematic diagram depicting a hydraulic circuit, according to one embodiment of the present invention.
Figure 4:
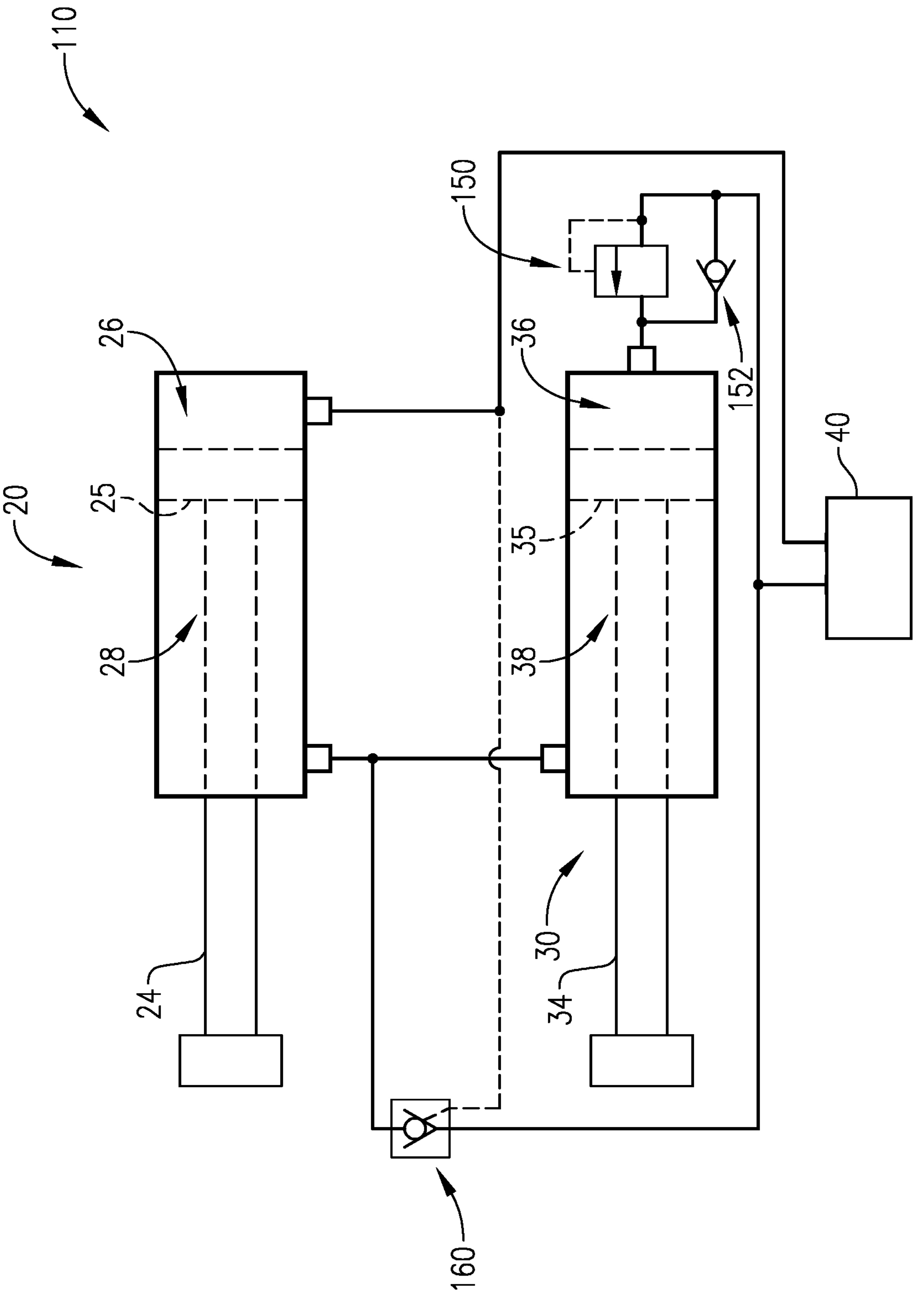
FIG. 4 is a schematic diagram depicting a hydraulic circuit, according to one embodiment of the present invention.

As shown in FIG. 3, in certain embodiments, system 10 may comprise a pilot-operated sequence valve 160 positioned between the main valve 40 and the rod side chamber 28 of the working cylinder 20. Similar to check valve 60 shown in FIG. 1 and FIG. 2, the pilot-operated sequence valve 160 is configured to selectively inhibit hydraulic fluid within the rod side chamber 28 of the working cylinder 20 and/or within the rod side chamber 38 of pressure amplification cylinder 30 from flowing back toward the main valve 40. As shown, in certain embodiments, pilot-operated sequence valve 160 may be in the form of a two-position valve. However, the normal (resting) position is a closed check valve. Upon selective pressurization of the bore side chamber 26 of the working cylinder 20, the check valve of the pilot-operated sequence valve 160 is shifted to the open position, thereby providing an open pathway for the hydraulic fluid from the rod side chamber 28 to flow back toward the main valve 40. An alternative exemplary hydraulic circuit for a power amplification system 110 is schematically illustrated in FIG. 4. System 110 differs from system 10 shown in FIG. 1 primarily in that system 110 utilizes two or more passive valves to control the flow of hydraulic fluid to the pressure amplification cylinder 30, whereas system 10 utilizes a solenoid-operated valve to divert hydraulic fluid flow to pressure amplification cylinder 30. In particular, system 110 comprises a pressure relief valve 150 and a check valve 152 that operate to control the flow of hydraulic fluid into and out of the bore side chamber 36 of pressure amplification cylinder 30. System 110 may comprise a pilot-operated sequence (check) valve 160 positioned between the main valve 40 and the rod side chamber 28 of the working cylinder 20 configured to inhibit hydraulic fluid within the rod side chamber 28 of the working cylinder 20 and/or within the rod side chamber 38 of pressure amplification cylinder 30 from flowing back toward the main valve 40. System 110 can advantageously avoid the use of electric coils or solenoids, and the power boost (amplification) and recharge can occur without operator activation of the valves.

As shown in FIG. 4, a working hydraulic fluid can be selectively introduced and removed into and from system 110 by main valve 40. During a power amplification operation, main valve 40 introduces additional hydraulic fluid and/or pressure to the line in fluid communication with the rod side chamber 28 of the working cylinder 20 and the bore side chamber 36 of the pressure amplification cylinder 30. The additional hydraulic pressure overcomes the actuation force in the normally closed (NC) type pressure relief valve 150, thereby actuating the valve 150 and allowing hydraulic fluid to flow into the bore side chamber 36 of the pressure amplification cylinder 30. Upon completion of the power amplification operation, piston base 35 in the pressure amplification cylinder 30 is shifted in the direction of the bore side chamber 36, and the hydraulic fluid flows out of the bore side chamber 36 through the check valve 152 back toward the main valve 40.

Exemplary methods for providing power amplification to a hydraulic cylinder assembly will now be described in more detail. Although reference is made to components of the systems depicted in FIG. 1, FIG. 2, FIG. 3, and FIG. 4, and described above, it will be understood that the methods described herein may be performed using other configurations.

The piston base 25 of the working cylinder 20 may begin at least partially shifted toward the rod side chamber 28 such that the piston rod 24 extends at least partially out of the barrel 22. To effect movement of the piston rod 24 (and any attachments), hydraulic fluid from main valve 40 is introduced to the rod side chamber 28 of the working cylinder 20, thereby shifting the piston base 25 within barrel 22 in the direction of the bore side chamber 26.

When necessary or desired by the operator, a power amplification operation is activated by introducing a power amplification fluid to the bore side chamber 36 of the pressure amplification cylinder 30 so as to shift the amplification piston base 35 within the pressure amplification cylinder 30. For example, piston base 35 may be shifted in the direction of the rod side chamber 38 of the pressure amplification cylinder 30. This shift increases the pressure of the hydraulic fluid within both the rod side chamber 38 of the pressure amplification cylinder 30 and the rod side chamber 28 of the working cylinder 20. Generally, power amplification is achieved by increasing the effective area on the rod side of the piston base 25 of the working cylinder 20 by utilizing the area of the piston base 35 of the pressure amplification cylinder 35. Since the rod side chamber 38 of pressure amplification cylinder 30 is in fluid communication with the rod side chamber 28 of working cylinder 20, the piston base 35 of the pressure amplification chamber 30 can be utilized to increase the effective area of the rod side of piston base 25 of the working cylinder, thereby increasing the effective force applied to the rod side of piston base 25 (i.e., force=pressure×area).

In certain embodiments, as illustrated in FIGS. 1-3, to initiate the power amplification operation, the power amplification valve 50 diverts at least a portion of the hydraulic fluid introduced by main valve 40 to the bore side chamber 36 of the pressure amplification cylinder 30. In such embodiments, at least a portion of the power amplification fluid comprises a working hydraulic fluid introduced by main valve 40. In certain embodiments, the operator can command the power amplification operation to activate by activating a solenoid 52 on power amplification valve 50, thereby shifting the valve 50 to divert the working hydraulic fluid introduced by the main valve 40 to the bore side chamber 36 of the pressure amplification cylinder.

In certain embodiments, activation of the power amplification operation comprises selectively activating a solenoid 62 on check valve 60, thereby activating check valve 60 to inhibit the hydraulic fluid within the rod side chamber 28 of the working cylinder 20 and the rod side chamber 38 of the pressure amplification cylinder 30 from flowing toward the main valve 40. This operation of the check valve 60 can protect upstream hoses and components from over-pressurizing during the power amplification operation.

Alternatively, as illustrated in FIG. 4, activation of the power amplification operation comprises increasing the flow of hydraulic fluid introduced by the main valve 40, thereby increasing the pressure in the line so as to overcome the actuation force in the normally closed (NC) type pressure relief valve 150. This increase in pressure actuates the pressure relief valve 150 and allows hydraulic fluid to flow into the bore side chamber 36 of the pressure amplification cylinder 30.

After activation and completion of the power amplification operation, the solenoids 52, 62 on valves 50, 60 are deactivated, thereby shifting the valves 50, 60 back to normal operation. In doing so, at least a portion of the hydraulic fluid/pressure from the rod side chamber 28 of the working cylinder 20 and/or the rod side chamber 38 of the pressure amplification cylinder 30 may be released and allowed (or directed) to flow back toward main valve 40. Additionally, at least a portion of the hydraulic power amplification fluid from the bore side chamber 36 of the pressure amplification cylinder 30 is allowed to flow toward a hydraulic fluid reservoir 42. This allows or causes the piston base 35 of the pressure amplification cylinder 30 shifts toward the bore side chamber 36, decreasing the pressure of the hydraulic fluid therein.

Alternatively, after activation and completion of the power amplification operation, the hydraulic fluid flows out of the bore side chamber 36 through the check valve 152 back toward the main valve 40, thereby deactivating the pressure relief valve 150 and shifting the piston base 35 in the pressure amplification cylinder 30 in the direction of the bore side chamber 36.

In certain embodiments, the spring 39 disposed within the rod side chamber 38 of the pressure amplification cylinder 30 can supply at least a portion of the force necessary to shift the amplification piston base 35 toward the bore side chamber 36. Additionally, or alternatively, the flow of hydraulic fluid to the rod side chamber 38 of the pressure amplification cylinder 30 can supply at least a portion of the force necessary to shift the amplification piston base 35 toward the bore side chamber 36.

As noted above, upon completion of a power amplification operation, shifting of the piston base 35 in barrel 32 toward the bore side chamber 36 can cause a rapid drop in pressure of the hydraulic fluid within the rod side chamber 28 of the working cylinder 20 and cause a delay in the working cylinder 20 operation. However, in certain embodiments, the restriction element 70 at least partially inhibits flow of the hydraulic fluid from the rod side chamber 28 of the working cylinder 20 to the rod side chamber 38 of the pressure amplification cylinder 30, thereby reducing or eliminating the delay in operation of the working cylinder 20.

Embodiments of the present invention are particularly useful for hydraulic cylinder assemblies on heavy-equipment machines and/or agricultural equipment. In particular embodiments, the hydraulic circuits and systems may be used to provide supplemental breakout force to working cylinders on loader equipment, such as bucket loaders. Embodiments of the present invention can therefore function to apply more breakout force to the bucket of the bucket loader for a short interval of time. This power amplification can be particularly useful for breaking out concrete, removing stumps, and digging where more bucket breakout force is required.

Accordingly, certain embodiments of the present invention are directed to methods for providing power amplification to a hydraulic cylinder assembly installed on a loader. Exemplary loaders may include compact utility loaders, such as those described in U.S. Pat. No. 11,208,786, U.S. Patent Application Publication No. 2021/0031845, U.S. Patent Application Publication No. 2021/0032836, U.S. Patent Application Publication No. 2021/0032842, U.S. Patent Application Publication No. 2021/0032843, and U.S. Patent Application Publication No. 2021/0032847, each of which is incorporated by reference herein their entireties.

Figure 5:
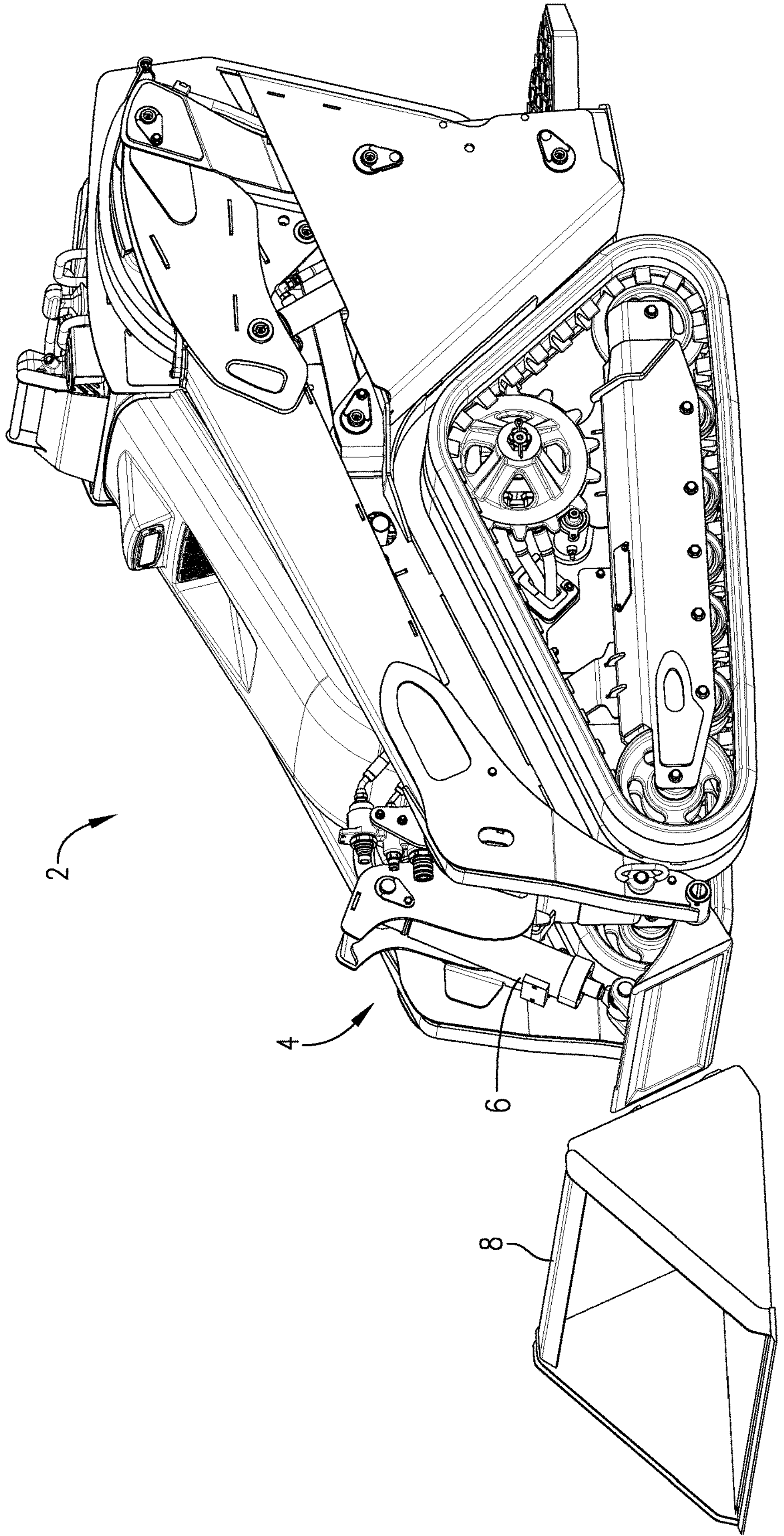
FIG. 5 is a perspective view of a compact utility loader illustrating an attachment in the form of a bucket being separated from loader arms of the compact utility loader.

As shown in FIG. 5, a loader 2 may comprise a hydraulic cylinder assembly 4 installed thereon. The hydraulic cylinder assembly 4 may comprise a working cylinder 6, which can operate according to the hydraulic circuit systems and methods described herein. For example, working cylinder 6 may operate as working cylinder 20 of system 10 or system 110, described above. Hydraulic fluid may be introduced into the working cylinder 6, thereby shifting a working piston (not shown) disposed within the working cylinder 6 and moving a loader attachment 8 mechanically coupled to the working piston. As shown, in certain embodiments, the loader attachment 8 comprises a loader bucket.

As described above, a power amplification operation of the hydraulic cylinder assembly 4 can be activated by shifting an amplification piston within the pressure amplification cylinder. The pressure amplification cylinder is in fluid communication with the working cylinder 6 such that shifting the amplification piston increases the pressure of the hydraulic fluid within the working cylinder 6, thereby increasing the force applied to the piston base within the working cylinder 6. As described above, this the power amplification can be used to selectively provide an enhanced breakout force for the working cylinder 6, which supplies an interval of increased force to the loader attachment 8.

Although the invention has been described with reference to the one or more embodiments illustrated in the figures, it is understood that equivalents may be employed and substitutions made herein without departing from the scope of the invention as recited in the claims. Additionally, it should be understood that the features described in the embodiments herein may be included individually or in combination with one or more other features described herein in relation to one or more embodiments within the scope of the invention. Additional advantages of the various embodiments of the invention will be apparent to those skilled in the art upon review of the disclosure herein and the working examples below.

As used herein, the phrase "and/or," when used in a list of two or more items, means that any one of the listed items can be employed by itself or any combination of two or more of the listed items can be employed. For example, if an apparatus is described as containing or excluding components A, B, and/or C, the composition can contain or exclude A alone; B alone; C alone; A and B in combination; A and C in combination; B and C in combination; or A, B, and C in combination.

Having thus described one or more embodiments of the invention, what is claimed as new and desired to be protected by Letters Patent includes the following:

1. A hydraulic power amplification system comprising:

a working cylinder comprising a first barrel, a first piston base slidably disposed within the first barrel and defining a first bore side chamber and a first rod side chamber, and a first piston rod extending from the first piston base through the first rod side chamber;

a pressure amplification cylinder comprising a second barrel, a second piston base slidably disposed within the second barrel and defining a second bore side chamber and a second rod side chamber, and a second piston rod extending from the second piston base through the second rod side chamber, wherein the pressure amplification cylinder is configured to selectively provide hydraulic fluid to the working cylinder to amplify an operating pressure of the working cylinder, wherein when the pressure amplification cylinder is providing the hydraulic fluid to the working cylinder, the second rod side chamber of the pressure amplification cylinder provides the hydraulic fluid to the first rod side chamber of the working cylinder; and further comprising a restriction element positioned between the second rod side chamber and the first rod side chamber, and configured to at least partly inhibit flow of the hydraulic fluid to the second rod side chamber when the hydraulic fluid is being released from the first rod side chamber.

2. The system of claim 1, further comprising a main valve configured to selectively introduce and/or remove the hydraulic fluid to/from the first bore side chamber and the first rod side chamber of the working cylinder.

3. The system of claim 2, further comprising a power amplification valve, wherein upon activation, the power amplification valve is configured to divert at least a portion of the hydraulic fluid from the working cylinder to the power amplification cylinder.

4. The system of claim 2, further comprising a check valve positioned between the main valve and the first rod side chamber of the working cylinder, and wherein the check valve is configured to inhibit the hydraulic fluid within the second rod side chamber and/or the first rod side chamber from flowing toward the main valve.

5. The system of claim 1, further comprising a spring disposed within the second rod side chamber and configured to resiliently shift the second piston base toward the second bore side chamber after completion of a power amplification operation.

6. A loader comprising a hydraulically operated component mechanically coupled with the hydraulic power amplification system of claim 1.

7. The loader of claim 6, wherein the first piston rod is mechanically coupled to a bucket installed on the loader such that movement of the first piston base within the working cylinder rotates the bucket.

8. A method for providing power amplification to a hydraulic cylinder assembly comprising a working cylinder having a working piston disposed therein and a pressure amplification cylinder having an amplification piston disposed therein, the method comprising:

(a) introducing hydraulic fluid to a first rod side chamber of the working cylinder, the first rod side chamber being in fluid communication with a second rod side chamber of the pressure amplification cylinder; and (b) activating a power amplification operation by introducing a power amplification fluid to a bore side chamber of the pressure amplification cylinder so as to shift the amplification piston within the pressure amplification cylinder, thereby increasing the pressure of the hydraulic fluid within both the second rod side chamber of the pressure amplification cylinder and the first rod side chamber of the working cylinder, further comprising, after activation (b), releasing at least a portion of the hydraulic fluid from the first rod side chamber, wherein during the releasing, a restriction element positioned between the second rod side chamber and the first rod side chamber at least partially inhibits flow of the hydraulic fluid from the first rod side chamber to the second rod side chamber.

9. The method of claim 8, wherein upon activation (b), a power amplification valve diverts at least a portion of the hydraulic fluid to the second bore side chamber as the power amplification fluid.

10. The method of claim 8, wherein upon activation (b), a check valve inhibits the hydraulic fluid within the second rod side chamber and/or the first rod side chamber from flowing toward a main hydraulic fluid valve.

11. The system of claim 8, wherein during the releasing, a spring disposed within the second rod side chamber resiliently shifts the amplification piston toward the second bore side chamber.

12. A method for providing power amplification to a hydraulic cylinder assembly installed on a loader, the hydraulic cylinder assembly comprising a working cylinder and a pressure amplification cylinder, the method comprising:

(a) introducing a hydraulic fluid to the working cylinder, thereby shifting a working piston disposed within the working cylinder and moving a loader attachment mechanically coupled to the working piston; and (b) activating a power amplification operation by shifting an amplification piston within the pressure amplification cylinder, the pressure amplification cylinder comprising a rod side chamber being in fluid communication with a rod side chamber of the working cylinder such that shifting the amplification piston increases the pressure of the hydraulic fluid within the rod side chamber of the working cylinder, further comprising, after activation (b), releasing at least a portion of the hydraulic fluid from the working cylinder, wherein during the releasing, a restriction element positioned between the pressure amplification cylinder and the working cylinder at least partially inhibits flow of the hydraulic fluid from the working cylinder to the pressure amplification cylinder.

13. The method of claim 12, wherein the loader attachment comprises a loader bucket.

14. The method of claim 12, wherein the activation (b) comprises introducing a power amplification fluid to the pressure amplification cylinder, thereby shifting the amplification piston.

15. The method of claim 14, wherein the activation (b) comprises diverting at least a portion of the hydraulic fluid to the pressure amplification cylinder as the power amplification fluid.

* * * * *